March 14, 1933. W. H. BOZARTH 1,900,974
PROCESS OF DEHYDRATING VEGETABLES AND THE LIKE
Filed May 11, 1928 4 Sheets-Sheet 1
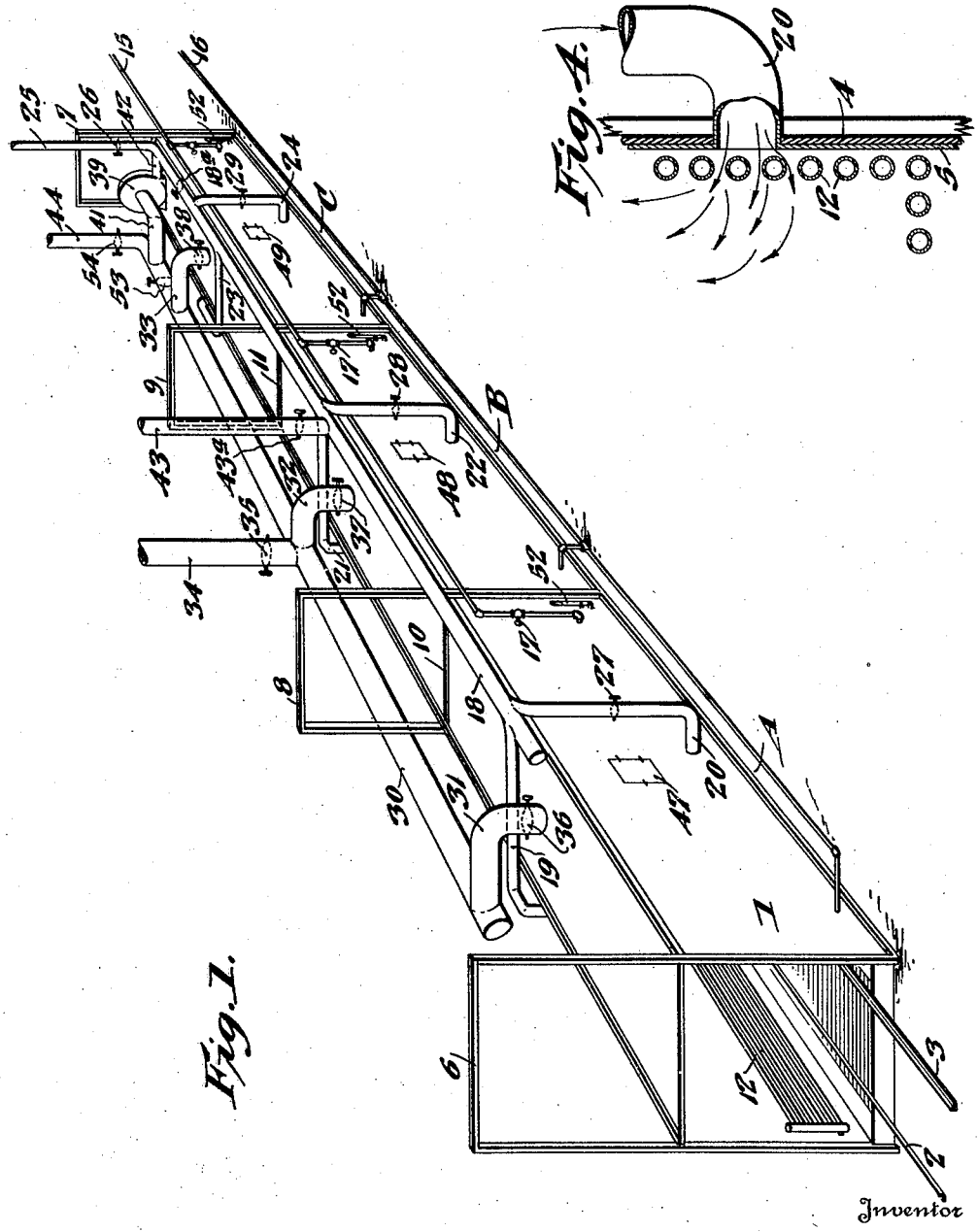

March 14, 1933. W. H. BOZARTH 1,900,974
PROCESS OF DEHYDRATING VEGETABLES AND THE LIKE
Filed May 11, 1928 4 Sheets-Sheet 2
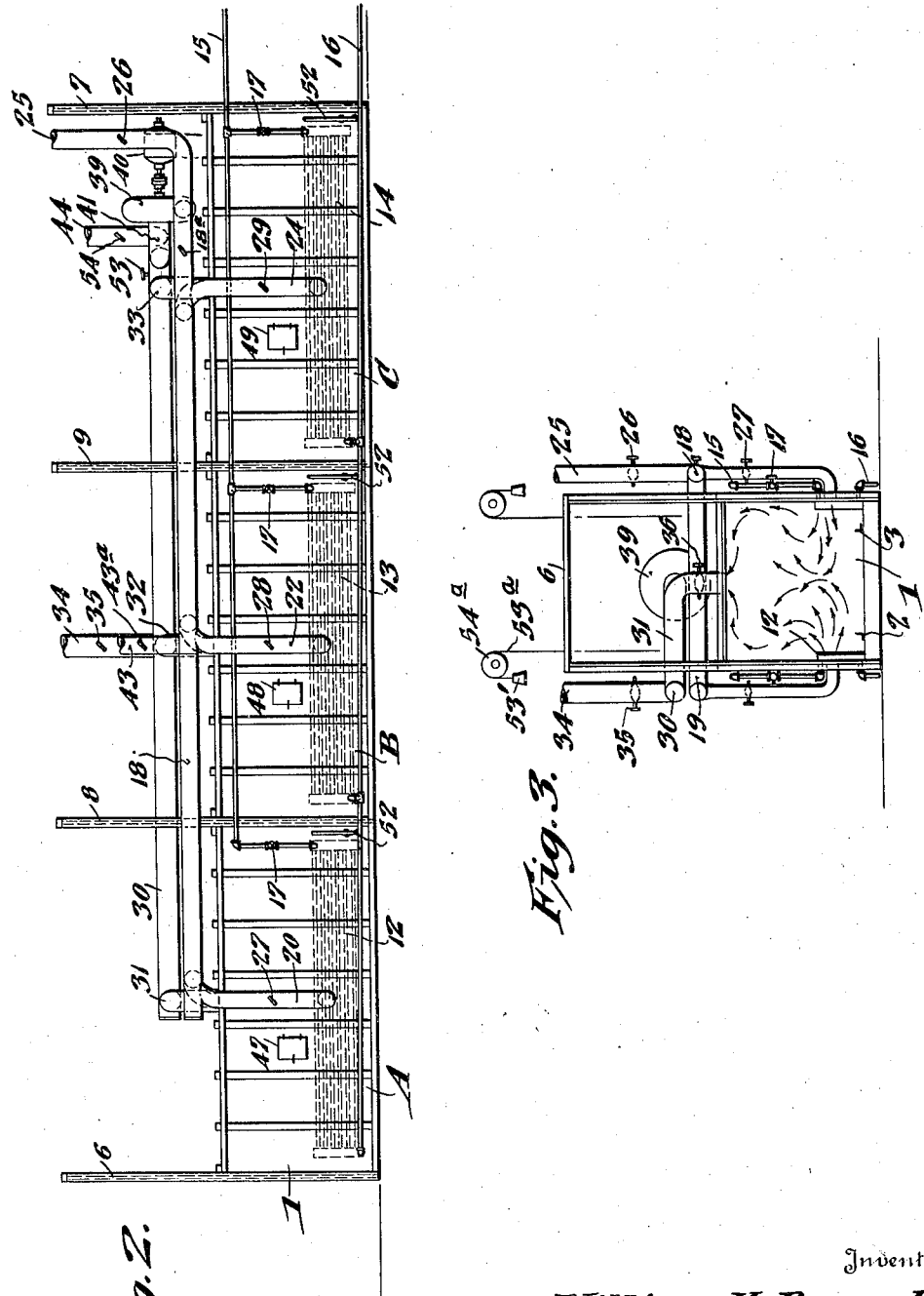
Inventor
William H. Bozarth
By Lloyd W. Batch
Attorney March 14, 1933.    W. H. BOZARTH    1,900,974
PROCESS OF DEHYDRATING VEGETABLES AND THE LIKE
Filed May 11, 1928    4 Sheets-Sheet 3
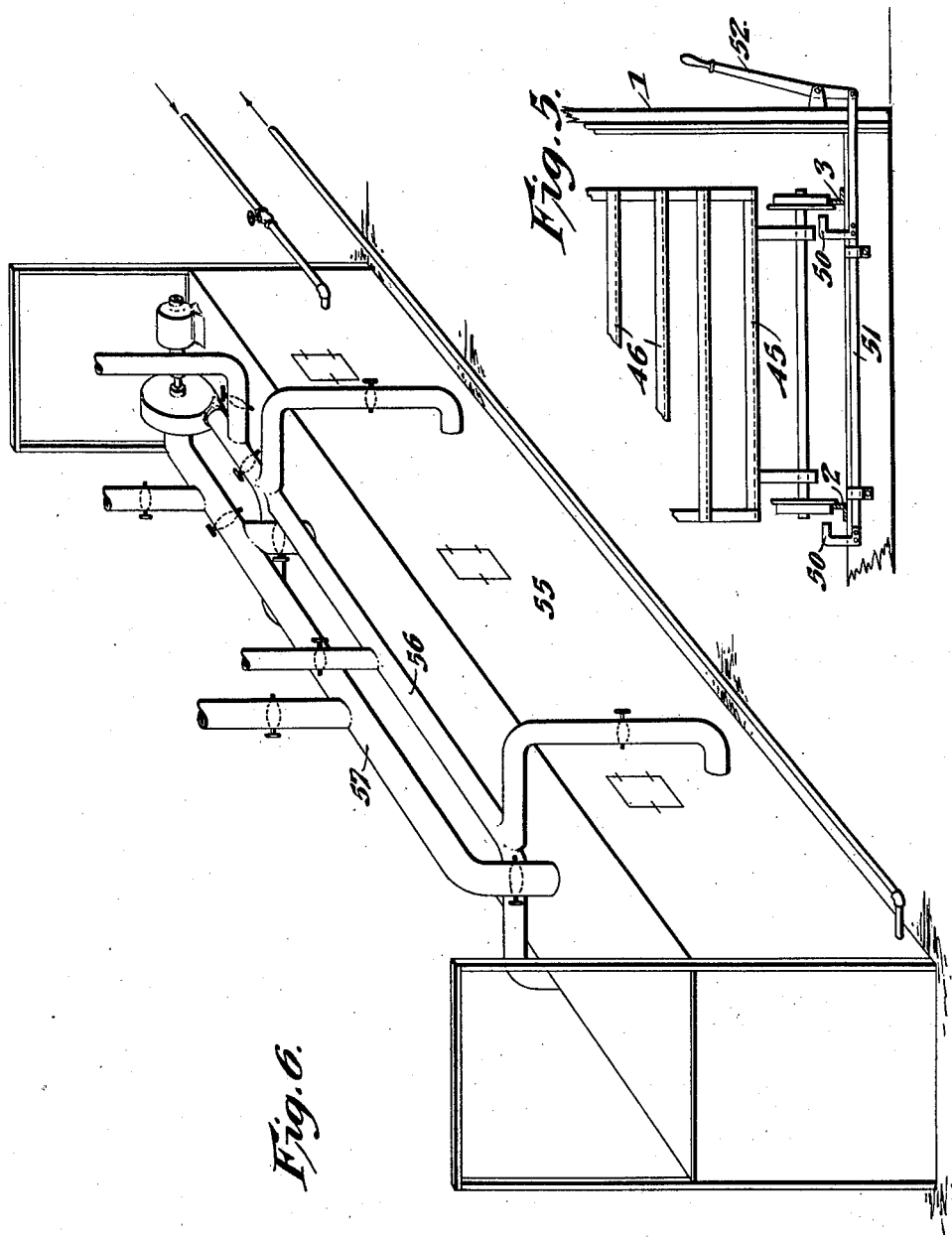
Inventor
William H. Bozarth
By Lloyd W. Patch
Attorney Patented Mar. 14, 1933

1,900,974

UNITED STATES PATENT OFFICE

WILLIAM H. BOZARTH, OF VINELAND, NEW JERSEY, ASSIGNOR TO OSBORN PRODUCTS INC., A CORPORATION OF NEW JERSEY, EDWARD E. GROSSCUP, RECEIVER

PROCESS OF DEHYDRATING VEGETABLES AND THE LIKE

Application filed May 11, 1928. Serial No. 277,090.

My invention relates to apparatus for and the process of dehydrating vegetables and the like, and particularly to a structure of this character in which dehydration is accomplished by the circulation of air around the material.

An object of this invention is to provide an apparatus for the purpose set forth which is of simple and inexpensive construction, which will prove efficient and economical in operation, and which can be controlled and adjusted to regulate the dehydrating process and vary the same to suit the requirements of different materials and different conditions of operation.

Another object is to so construct the apparatus that dehydration can be accomplished by the creation of a vacuum to draw off moisture, by the circulation of atmospheric air at natural or increased temperature, or by circulation with the circuit closed so that agitation and circulation of the air within the apparatus is accomplished without the introduction of atmospheric air.

A further object is to provide apparatus of such character that the heated air used in the main steps of the dehydrating operation can be employed to dry and pre-treat a large quantity of material to prevent spoiling when the vegetables or other material to be dehydrated is received in quantities larger than can be taken care of in the actual dehydrating mechanism.

Still another object is to provide a process of dehydrating vegetables, fruits, and the like which can be carried efficiently and economically to dehydrate various materials and which contemplates the control of the moisture extraction to thus retain the natural color and the natural salts and other elements within the dried product.

With the above and other objects in view which will be apparent to those skilled in the art, my present invention includes certain novel features of construction and combinations of parts, as well as certain novel steps of procedure and methods which will be apparent to those skilled in the art and some of which will be pointed out in connection with the drawings.

In the drawings:

Figure 1 is a view in perspective showing an apparatus constructed in accordance with my invention and with which my improved process can be accomplished.

Fig. 2 is a view in side elevation.

Fig. 3 is an end view.

Fig. 4 is a fragmentary detail view of one of the air conduits and its connection with the main structure.

Fig. 5 is a fragmentary detail view showing one of the dehydrated cars.

Fig. 6 is a view similar to Fig. 1 showing a modified construction.

Figure 7:
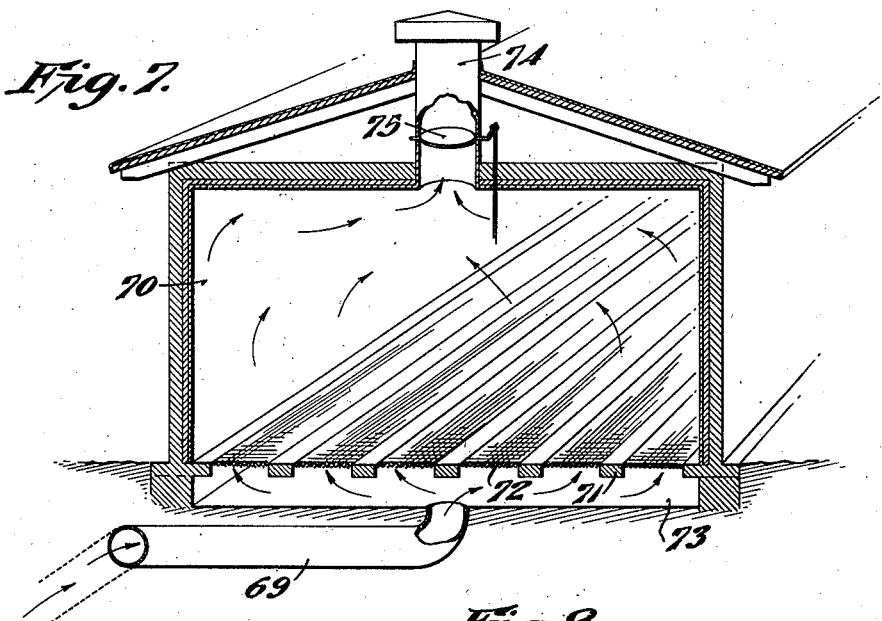
Fig. 7 is a vertical sectional perspective view of the pre-drying compartment.

As illustrated in Figs. 1, 2 and 3 I have shown a drying tunnel apparatus having a plurality of dehydrating compartments which can be used in treating several quantities of the same material in carrying the same through successive steps, or which can be employed in dehydrating several quantities of material of different characters, as for instance, fruit and vegetables in different compartments, or leeks or onions in one compartment and less odoriferous vegetables in other compartments, it having been found that it is not possible to dehydrate some vegetables, fruits and the like in a closed compartment with others, as the one will become tainted with the odor and flavor of the other.

As here shown the dehydrating tunnel 1 is made of elongated form and has the track rails 2 and 3 extending through the length thereof, these track rails being preferably laid on an incline from one end to the other. The tunnel 1 has the side and top walls thereof preferably formed with a layer 4 of insulation to guard the interior against temperature changes introduced by a difference or variation in the atmospheric temperature, and a metal or other lining 5 is preferably provided throughout the interior of the tunnel to protect against the absorption of moisture, odors and the like. The tunnel 1 is open at both ends and these ends will be closed by doors movable in guides 6 and 7. Intermediate the ends, guides 8 and 9 are provided and doors 10 and 11 mounted in these guides can be closed down into the passage of the tunnel to divide the length thereof into three compartments. It will be appreciated that the division might be into a greater or lesser number of compartments depending upon the length of the tunnel and the conditions of use.

As best shown in Fig. 2 radiator or heating pipes are provided along the sides of each of the compartments as shown at 12, 13 and 14, these radiators or heating coils being connected with supply and return pipes 15 and 16 which are at their free ends connected with a boiler or other heating system. Valves 17 are provided to control the heat within the several radiators or coils.

An air supply pipe 18 extends along one side of the tunnel 1 at a location to leave clear room for doors 10 and 11 and branch air supply pipes 19 and 20 lead from the main pipe 18 to connect with compartment A, branch air supply pipes 21 and 22 lead to connect with compartment B, and branch pipes 23 and 24 lead to connect with compartment C. As shown in Fig. 4 the ends of these several branch air supply pipes preferably open into the compartments to discharge the air therefrom through the radiator or heating coil structures 12, 13 and 14, the air being thus heated as it passes into the several compartments. Air will be supplied through pipe 43 to the main air supply lead 18 and a valve 43a will control the opening of this pipe 43, while valves 27, 28 and 29 are provided in the branch pipes 20, 22 and 24, corresponding valves being provided in pipes 19, 21 and 23.

A main air discharge pipe 30 extends along the length of the tunnel 1 and has branches 31, 32 and 33 leading from the top of the compartments A, B and C connected therewith. This pipe 30 is relatively larger than the air supply pipe 18 and is provided with an outlet lead 34. Valve 35 is fitted in the outlet lead and the several branches are controlled by valves 36, 37 and 38.

A fan 39 mounted at one end of the tunnel and operated by motor 40, or other suitable means, has the eye thereof connected by pipe 41 with discharge pipe 30 and the discharge of the pump is connected by pipe 42 with air supply pipe 18. A suction intake pipe 25 is connected with air supply pipe 18, adjacent pipe 42 and is controlled by valve 26, a valve 18a being provided in pipe 18 to cut the same off so that pipe 25 can be used as an exhaust pipe. A valve controlled suction intake pipe 44 is connected with discharge pipe 30 preferably adjacent the connection of pipe 41.

Drying cars of which one is shown at 45 in Fig. 5, are mounted on the track rails 2 and 3 and are provided with spaced rack portions or rack supports 46 in which the material to be dehydrated will be placed. The racks or trays to receive the material preferably have the bottoms thereof made of wire netting or other material which will permit a free and ready circulation of air, and when the cars are rolled into the various compartments A, B and C they will be so located that the air discharged as indicated by the arrows in Fig. 4 will be directly circulated around and through the racks or trays. Hand hole doors 47, 48 and 49 are provided for the compartments A, B and C so that the operator can have access to extract samples of the material as the same is treated.

As has been mentioned the track rails 2 and 3 are preferably laid on an incline from one end of the tunnel to the other and it is desirable that some means be provided to chock the wheels of the cars to hold the same in place within the compartments.

Referring to Fig. 5, the arms 50 on slide bar 51 fitted beneath the rails 2 and 3 are disposed to overlie the track rails to serve as chock blocks when the bar 51 is slid in one direction and this movement of the bar to bring the arms 50 into the operative and inoperative positions is accomplished through hand levers 52 accessible from the outside of the tunnel.

The several doors can be mounted on cables 53a working over rollers 54a and provided with counterbalance weights 53' and these doors are thus suspended to be readily operated.

In dehydrating vegetables with my apparatus, the material is preferably cut or sliced, washed and then placed upon the trays or racks of the cars 45. These cars are moved into the compartments A, B, or C as the case may be, and the doors are closed. The valves 36, 37 and 38 in the discharge branches 30 and valve 53 in pipe 30 are opened on the intake side of the fan and valve 26 in pipe 25 is opened on the discharge side, valves 18a, 35, 43a and 54 are closed. With this arrangement the fan 39 is operated to exhaust the several compartments and create a partial vacuum therein to extract surface moisture contained by the material. After this operation has been continued for a sufficient time, depending upon the material being treated, the valves in branch pipes 19 to 24 are opened, valve 18a, 35, 43a and 54 are opened and valves 26 and 53 are closed. The fan 39 then takes in atmospheric air through pipe 44 and this is forced through the several branch pipes 19 to 24, inclusive, to discharge through the radiator coils within the several compartments, this heated air being injected to circulate through and around the contents of the racks carried by the cars. The air forced into the compartments will escape through the branch pipes into discharge pipe 30 and then will pass through discharge outlet 34; however, due to the fact that the air is introduced under pressure whereas the discharge is not forced, a pressure will be maintained within the compartments. This operation might be continued until the moisture content of the material is extracted and dehydration has been accomplished, but it has been found that vegetables and materials such as cabbage, parsley and the like lose their natural color under continuous treatment with heated atmospheric air, that the thicker vegetable materials such as celery will be dried or seared at the ends of the fibers to close the same against proper extraction of the moisture within the cells, and that all materials lose the natural odor when this circulation of heated atmospheric air is maintained for a great length of time. To counteract this, I have found that intermittent treatment by the circulation of atmospheric air and treatment with the system closed to circulate the moisture-laden air within the compartments will not only serve to retain the color, flavor and odor and to maintain the material in condition with the pores or cells open for most efficient dehydration, but that the closed circulation will bring back or restore the material where the direct dehydration with the heated atmospheric air has been too long prolonged. This closed circulation is accomplished by closing valve 35 and opening valve 53 and at the same time closing valve 54 against the intake of atmospheric air to thus maintain a closed system with the fan exhausting air through pipe 30 and discharging the same air through supply pipe 18 and its branches. With this step carried on intermittently a proper humidity is maintained within the compartments and the material can be treated most efficiently.

During this treatment by introduction of heated atmospheric air and discharge of the air to take moisture from the material being treated, it is necessary that the process of the dehydration of the material be watched, especially where the material is in large pieces or is of a pulpy character, and when the surface becomes dry to such an extent that surface hardening commences, this introduction and withdrawal of atmospheric air must be stopped and the system closed for recirculation of the air within the compartment, so that moisture taken from the material will be circulated in the air over and in contact with those parts where surface hardening might take place, to thus soften the surface fibres and texture in all parts so that the surface pores and interstices will be opened to allow escape and withdrawal of moisture from the body of the pieces of material, as the process is continued. At no time is the introduction of moisture from any extraneous source resorted to, or necessary, in carrying out my process, and as the steps are carried forward the material will be uniformly dried, without hardening or over drying or crystallizing of any portion. The dehydrated material will have a substantially uniform moisture content in all parts, and the odor, flavor and color are preserved by the avoidance of surface hardening and of introduction of extraneous moisture.

As illustrated in Fig. 6, the tunnel 55 has a single compartment and the air supply and discharge pipes 56 and 57 are connected with this in substantially the manner set forth above. With this construction the pipes can be led and connected more directly as it is not necessary to clear the way for doors as with the structure embodying a plurality of compartments within the tunnel. This single compartment tunnel might be made of any desired length to accommodate any number of cars and the branch pipes from the air supply and discharge pipes can be connected with the compartments at points to accomplish a most efficient circulation under the given conditions.

Figure 8:
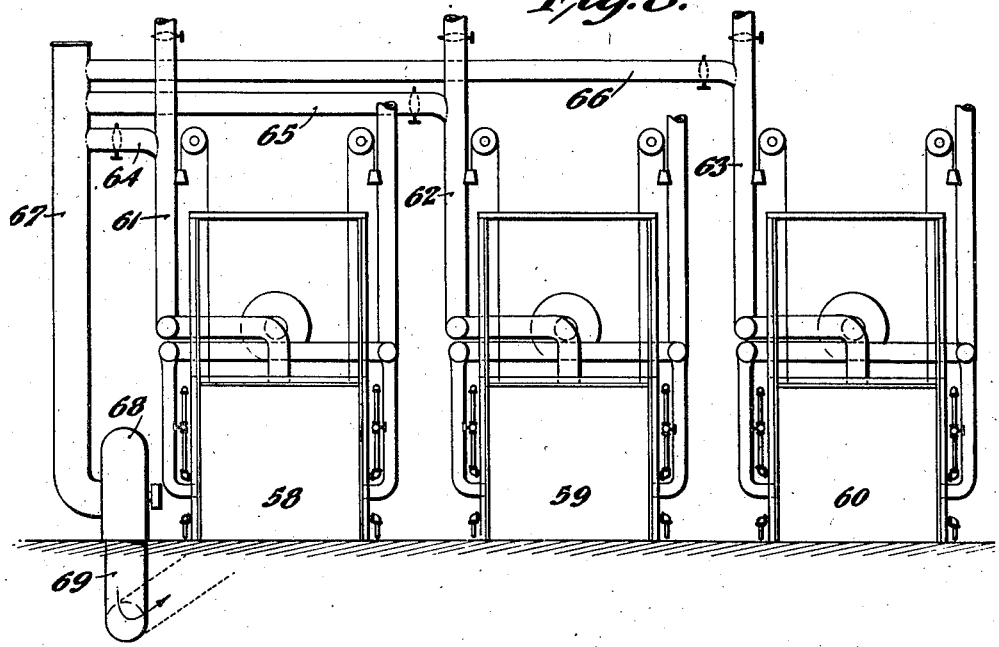
Fig. 8 is a view in elevation showing several of the drying tunnel apparatuses coupled together to give an air supply connection for the pre-drying compartment.

As shown in Figs. 7 and 8 I have illustrated an arrangement for pre-drying material using the heated air from a plurality of drier tunnels and apparatus generally indicated at 58, 59 and 60. The several air discharge pipes 61, 62 and 63 from these drier tunnels have valved leads 64, 65 and 66 extending therefrom and connected with a main pipe 67 which connects with the suction side of a fan 68, a discharge pipe 69 being connected with the compression side of the pump. A compartment or pre-drying room 70, which can be of any suitable construction, shape and dimensions, has the floor thereof made up of alternating supporting portions 71 and grating sections 72, a pit 73 being provided below this floor. The pipe 69 is extended to have its outer end opened substantially centrally within the pit 73, and cars having the material to be dehydrated thereon can be rolled into the compartment 70 upon the floor and the heated air through pipe 69 will be circulated around and through the material to pre-dry the same and drive off moisture to prevent rotting, molding, or other spoilage. One or more ventilators 74 are provided at the top of the compartment 70 and a valve control is provided at 75. This apparatus is found particularly advantageous where the material to be treated is received in carload lots or only through a short season when it must be taken care of quickly to prevent spoiling, and where the normal capacity of the dehydrating apparatus will not prove sufficient.

In carrying out the process of my invention, I cut, slice or otherwise open up the vegetables, fruits or other material, although it has been found not necessary to reduce some materials from their natural size and form; then this material is preferably washed and is placed upon the racks or trays. If conditions warrant the material in the trays will then be placed in the pre-drying compartment and the temperature and air circulation there will be maintained to drive off excess moisture and keep the material in condition to prevent spoiling; or, the material can be introduced directly into the dehydrating tunnels. The process of dehydration is then carried out by creating a vacuum, by introducing and circulating outside air to take moisture from the material and by intermittently closing the source of outside air and circulating the moisture-laden air back through the material to preserve a proper degree of surface humidity and prevent the loss of color, flavor and odor.

With my improved apparatus and process I have found it possible to dehydrate parsley, celery, onions, cabbage and many other vegetables from their natural state to a dried state most advantageous for powdering the same for use in seasonings, vegetable salts, cream soups, sauces, etc., in a period of time much less than is required where a direct circulation of outside air or a direct closed circulation have been used; and, at the same time I am able to preserve the natural color, odor and taste as it is possible to carry out the process to remove the moisture and accomplish dehydration without cooking the material or extracting or otherwise affecting the natural salts and ingredients.

While I have herein shown and described only certain specific forms of apparatus and have suggested only certain possible steps of procedure in carrying out my improved process, it will be appreciated that changes and variations can be made without departing from the spirit and scope of my invention.

I claim:

1. The process of dehydrating fruit and vegetable materials comprising, placing the material in a closed compartment, introducing outside air into said compartment and discharging said air from the compartment to withdraw moisture for a period of time, closing the source of outside air and the discharge thereof and recirculating the air within the compartment to take up moisture from the material and by passing the moisture laden air over the material bring all portions of the surface to uniform moistened condition, and alternately effecting the circulation of outside air and the recirculation of moisture laden air through the compartment until the material has been dehydrated to the desired degree, the entire process being effected without the introduction into the compartment of moisture from an extraneous source.

2. The process of dehydrating fruit and vegetable materials comprising, placing the material into a closed compartment, introducing into the compartment low down therein a continuous supply of heated outside air to circulate around the material and absorb moisture therefrom, discharging the moisture laden outside air from the compartment for a period of time, closing the source of outside air and the discharge thereof and recirculating the air within the compartment to absorb moisture from the material and by contacting with the surface thereof to establish a substantially uniform moisture content on all parts of the surface, and alternately effecting the circulation of outside air and the recirculation of moisture laden air without supplementing the moisture content from an extraneous source through the compartment until the material has been dehydrated to the desired degree.

3. The process of dehydrating fruit and vegetable materials comprising, placing the material into a closed compartment, creating a partial vacuum therewithin to withdraw surface moisture from said material, then continuously introducing into and continuously discharging outside air from said compartment for a period of time, closing the source of outside air and the discharge thereof and recirculating the moisture-laden air within the compartment, and alternately effecting the circulation of outside air and the recirculation of moisture-laden air through the compartment until the material has been dehydrated to the desired degree, the entire process being effected without the introduction into the compartment of an extransous source of moisture.

4. The process of dehydrating fruit and vegetable materials comprising, dividing the material into particles, placing the divided material into a closed compartment, creating a partial vacuum therein to withdraw surface moisture from said material, continuously introducing outside dry heated air into said compartment to circulate through the particles of material and take up moisture therefrom, discharging the moisture-laden air from said compartment for a period of time sufficiently short to prevent surface hardening, closing the source of outside air and the discharge thereof and recirculating air within the compartment to take up moisture from the material and restore uniform moisture content to all parts of the surface of the particles, and alternately effecting the circulation of outside air and the recirculation of moisture-laden air through the compartment until the material has been dehydrated to the desired degree, the entire process being effected without the introduction into the compartment of moisture from an extraneous source and the discharge of outside air being stopped in each interval before surface hardening takes place.

5. The process of dehydrating fruit and vegetable materials comprising, placing the material into a closed compartment, introducing low down into the compartment outside air to flow through the material, heating the air as introduced, discharging the air from said compartment to carry moisture from the material therewith, ceasing the step of introducing and discharging of outside air prior to the commencement of surface hardening of the material, closing the source of outside air and the discharge thereof and recirculating the air within the compartment to take up moisture from the material and by flowing through the material to restore all portions of the surface of the material to a uniform moisture content, and alternately effecting the circulation of outside air and the recirculation of moisture-laden air through the compartment until the material has been dehydrated to the desired degree, the entire process being effected without the introduction into the compartment of any moisture from an extraneous source.

In testimony whereof I hereunto affix my signature.

WILLIAM H. BOZARTH.